United States Patent [19]

Tsuneishi et al.

[11] Patent Number: 5,449,393
[45] Date of Patent: Sep. 12, 1995

[54] METHOD AND APPARATUS FOR DETECTING IRREGULAR PART OF OPTICAL FIBER

[75] Inventors: Katsuyuki Tsuneishi, Kanagawa; Yutaka Iwamura, Yokohama, both of Japan

[73] Assignee: Sumitomo Electric Industries, Ltd., Osaka, Japan

[21] Appl. No.: 194,379

[22] Filed: Feb. 8, 1994

[30] Foreign Application Priority Data

Feb. 15, 1993 [JP] Japan .................... 5-025063

[51] Int. Cl.$^6$ .................... C03B 37/07; C03B 37/025
[52] U.S. Cl. .................... 65/377; 65/381; 65/382; 65/484; 65/486; 65/491; 364/473; 356/73.1
[58] Field of Search .......... 65/377, 381, 484, 485, 65/486, 382, 491; 364/473; 356/73.1

[56] References Cited

U.S. PATENT DOCUMENTS

| | | | |
|---|---|---|---|
| 4,046,539 | 9/1977 | Smithgall | 65/382 |
| 4,146,373 | 3/1979 | Beckman | 65/381 |
| 4,793,840 | 12/1988 | Harding | 65/381 |
| 4,867,775 | 9/1989 | Cain | 65/382 |
| 5,073,179 | 12/1991 | Yoshimura | 65/382 |
| 5,079,433 | 1/1992 | Smith | 65/381 |
| 5,172,421 | 12/1992 | Nakamura | 356/73.1 |
| 5,185,636 | 2/1993 | Button | 356/73.1 |
| 5,314,517 | 5/1994 | Koening | 65/382 |

FOREIGN PATENT DOCUMENTS

| | | |
|---|---|---|
| 0392393 | 4/1990 | European Pat. Off. |
| 2359087 | 2/1987 | France |
| 2179339 | 8/1985 | United Kingdom |

OTHER PUBLICATIONS

Patent Abstracts of Japan, vol. 2, No. 33 (E-19) 6 Mar. 1978.
Patent Abstracts of Japan, vol. 2, No. 6 (E-4) 17 Jan. 1978.

Primary Examiner—Karen M. Hastings
Assistant Examiner—John Hoffmann
Attorney, Agent, or Firm—Cushman Darby & Cushman

[57] ABSTRACT

A method and apparatus are provided for detecting irregular portions of an optical fiber which arise due to microscopic bubbles, bruises, and the like during an optical fiber drawing process. The present invention operates by varying the pulling rate of a pulling capstan based on feeding back measurements of the external diameter of the optical fiber to the pulling capstan. The ratio of a given pulling rate variation to a predetermined time period is then computed. The computed ratio is then compared to a previously specified value.

4 Claims, 2 Drawing Sheets

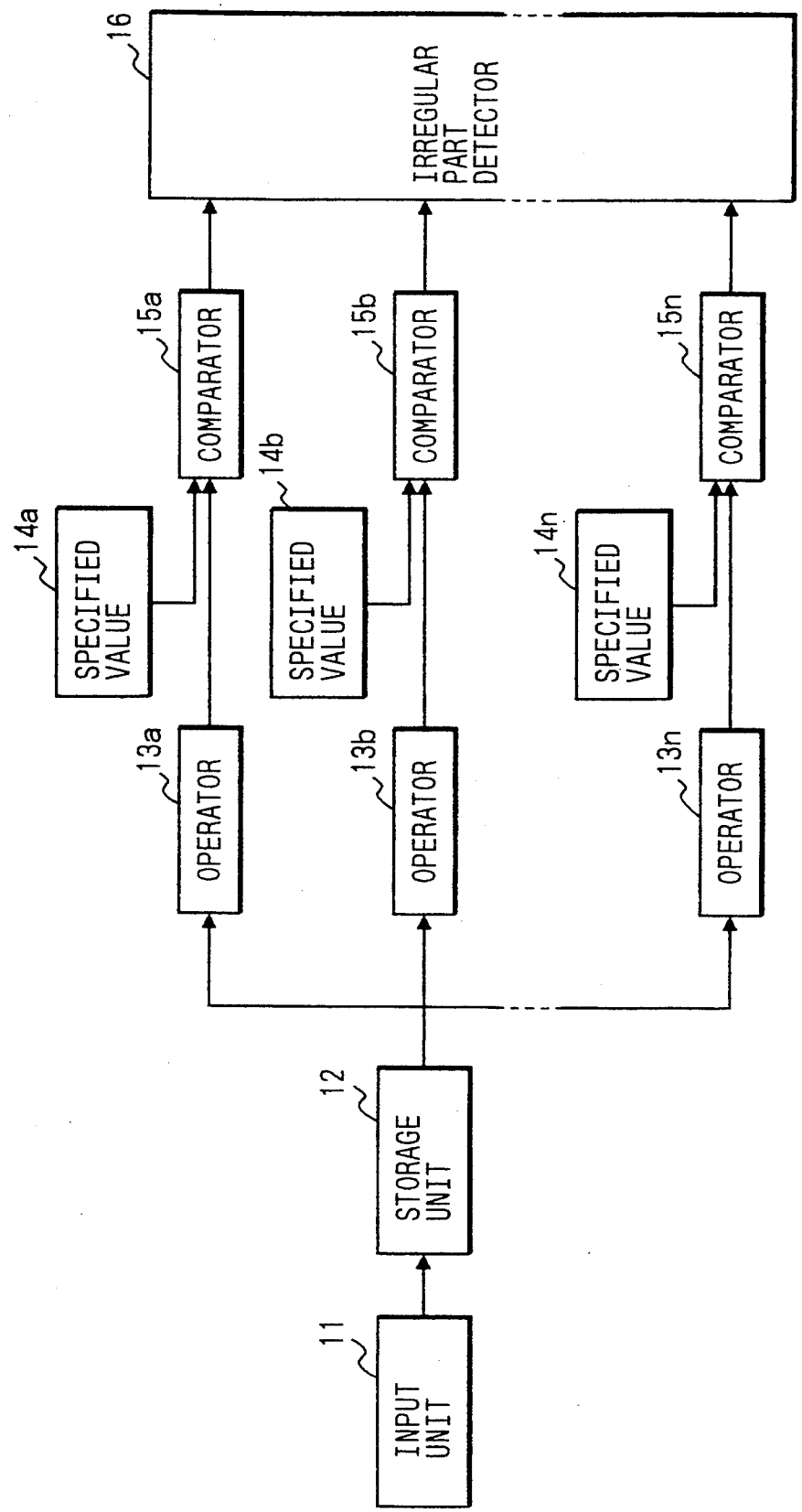

METHOD AND APPARATUS FOR DETECTING IRREGULAR PART OF OPTICAL FIBER

BACKGROUND OF THE INVENTION

1. Field of the Invention

The present invention relates to a method and an apparatus for detecting irregularities in an optical fiber, especially during a drawing process for forming the optical fiber.

2. Description of Related Art

It is known to employ a control method in which variations in the external diameter of the optical fiber are fed back to a pulling capstan. FIG. 3 (Prior Art) is a schematic diagram of a conventional drawing apparatus utilizing such a control method. An optical fiber preform 1 is melted in a heating furnace 2, pulled by a capstan 4, and formed into an optical fiber 3. The external diameter of the optical fiber 3 is measured by an external diameter measuring instrument 5 which is located just downstream of the heating furnace 2. Thereafter, the optical fiber 3 is coated with a resin by a coating unit 6, and then pulled through a resin curing furnace 7.

The external diameter measurements from the external diameter measuring instrument 5 are fed back to the control system of the pulling rate of the pulling capstan 4 so that the optical fiber has a consistent, predetermined external diameter (normally 125 $\mu$m).

When the external diameter of the optical fiber varies due the presence of contaminants, such as microscopic particulate matter, the variation in external diameter is detected by the external diameter measuring instrument 5. That is because the feedback system described above cannot compensate for such a discrete variation.

However, if bubbles or the like remain in the optical fiber preform over some length as it is drawn, the pulling rate of the pulling capstan 4 is suitably altered to maintain a consistent external diameter of the optical fiber 3. Accordingly, the external diameter measuring instrument 5 cannot detect irregular portions of the optical fiber 3. However, the bubbles may collapse when the optical fiber is drawn, even though the external diameter is controlled. Consequently, the core of the optical fiber deforms and causes increased transmission loss. Therefore, such deformed portions of the optical fiber must be detected in order to be removed.

SUMMARY OF THE INVENTION

It is therefore an object of the present invention to provide a method and apparatus for detecting an irregular portion of an optical fiber which overcomes the above-described problems of conventional methods.

A method of detecting an irregular portion of an optical fiber according to the present invention includes the steps of: altering an optical fiber pulling rate according to variations in the optical fiber external diameter which are fed back to a pulling capstan; computing, with respect to the resulting pulling rate variation during a predetermined period, the ratio of the pulling rate variation to the predetermined period; and comparing the computed value with a previously specified and stored value. In the method according to the present invention, the computing step includes the step of temporarily storing each point of time and a corresponding pulling rate, computing the ratio of the pulling rate variation to the period between a reference time and a predetermined time based on the stored data, and further computing the pulling rate variation by successively changing the reference time.

An apparatus according to the present invention includes a measuring device for measuring the external diameter of an optical fiber, and a processing unit for computing the ratio of the pulling rate variation to a predetermined period. The processing unit includes an input unit for sampling the pulling rate of a pulling capstan, a storage unit for storing the sampled pulling rate and a corresponding time datum, an operator for computing the ratio of pulling rate variation to a predetermined time period during which the pulling variation has resulted, a comparator for comparing the output of the operator with a previously specified and stored value, and a device for detecting an irregular portion of the optical fiber which operates on receiving the output of the comparator.

When a portion of the optical fiber preform having bubbles is drawn into an optical fiber, the bubbles can collapse or contract, causing the external diameter of the optical fiber to decrease. Measurements of the external diameter of the optical fiber are fed back from the external diameter measuring device to the pulling capstan. As a result, the pulling rate is decreases in order to compensate and maintain a consistent external diameter of the optical fiber.

However, even though the external diameter of the optical fiber is kept constant, the bubbles may still collapse or small amounts of bubbles may remain, which lowers the strength of the optical fiber and/or increases transmission losses. Therefore, the pulling rate is temporarily stored once, and variations thereof are processed as described above, whereby an irregular portion of the optical fiber which cannot be detected by the external diameter measuring device is still detected.

Other objects, features, and characteristics of the present invention, as well as the methods of operation and functions of the related elements of the structure, and the combination of parts and economies of manufacture, will become more apparent upon consideration of the following detailed description and appended claims, with reference to the accompanying figures, all of which form a part of this specification.

BRIEF DESCRIPTION OF THE DRAWINGS

FIG. 2 is a block diagram illustrating the components of the operation processing unit shown in FIG. 1.

DESCRIPTION OF THE PREFERRED EMBODIMENT

Figure 1:
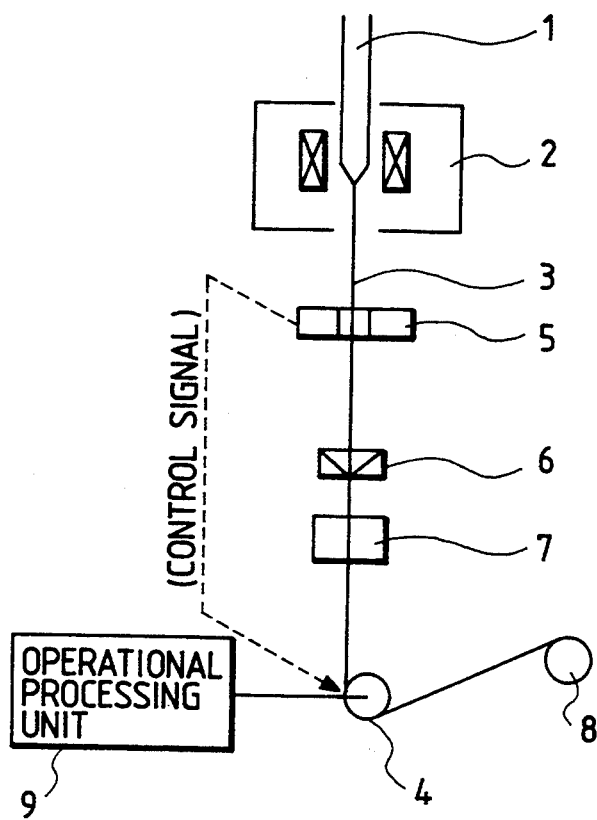
FIG. 1 is a schematic diagram showing an embodiment of the present invention in relation to an optical fiber drawing apparatus.
Figure 3:
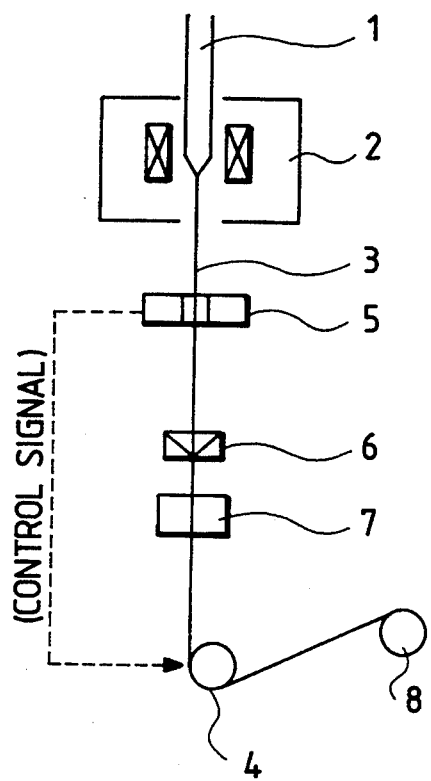
FIG. 3 (Prior Art) is a schematic block diagram illustrating a conventional optical fiber drawing apparatus.

Referring to FIGS. 1 and 2, an optical fiber preform 1 for forming optical fiber is melted in a heating furnace 2, pulled or drawn by a pulling capstan 4, and formed into an optical fiber 3. The external diameter of the optical fiber 3 is measured by an external diameter measuring device 5 located downstream of the heating furnace 2. The measured diameter is fed back to control the pulling rate of the capstan 4 so that the optical fiber has a consistent desired external diameter (typically about 125 $\mu$m). Operation processing unit 9 temporarily stores the pulling rate of the capstan 4 and determines whether any irregularities are present in the optical fiber based on the degree of variation in the pulling rate.

In the optical fiber drawing apparatus shown in FIG. 1, after the optical fiber 3 leaves the external diameter measuring device 5, it is coated with a resin by coating unit 6 and pulled through a curing furnace 7, then onto drum 8 via pulling capstan 4.

In FIG. 2, the components of the operational processing unit 9 are illustrated in a block diagram. Input unit 11 samples the pulling rate V of pulling capstan 4 at time T at fixed intervals. Storage unit 12 stores the sampled data. Operators 13a, 13b, ..., 13n obtain pulling rate variation ratios $|Va-Vo|/To-Ta, ..., |Vn-Vo|/To-Tn$ by dividing the pulling rate differences $Va-Vo, ..., Vn-Vo$ by time periods $T0-Ta, ..., T0-Tn$ at respective points of time after retrieving the pulling rates $Vo, Va, ..., Vn$ from storage unit 12 at corresponding times $Ta, ..., Tn$ specified retroactively by a predetermined period of time to reference time To (e.g., at the present point of time). Comparators 15a, ..., 15n compare the output signals of the operators 13a, ..., 13n with previously specified values stored in storage units 14a, ..., 14n and generate output signals only when the output signals of the operators are greater than the corresponding specified values. The values stored in storage units 14a, ..., 14n are optimal values corresponding to the rate variations to be detected, and are values which have been experimentally obtained with respect to the respective rate variations. Irregular optical fiber portion detector 16 operates according to output signals from the comparators. When the above-described operations are terminated, the reference time To is moved and the operations with respect to the next reference time To' are repeated to detect irregular portions of the optical fiber 3 over its entire length.

The size of the specified values stored in storage units 14a, ..., 14n and the time intervals $Ta-To, ..., Tn-To$ between the reference time and the specified time are determined by a pulling rate control method (PID control, coefficients, and the like) or irregular portion detection accuracy (the size of the bubbles therein, occurrence frequency, and the like). Moreover, it is also feasible to detect irregular portions with close attention by setting the plurality of specified values stored in storage units 14a, ..., 14n and that of the time period lengths $Ta-To, ..., Tn-To$ to compute the ratio of pulling rate variations to these values and period lengths.

Using the apparatus illustrated in FIGS. 1 and 2, testing was conducted to detect irregular portions of an optical fiber. More specifically, an optical fiber preform having a diameter of 50 mm was used to draw 1000 km of an optical fiber having an external diameter of 125 μm under the following conditions: $To-Ta=2$ sec; $To-Tb=10$ sec; $To-Tc=30$ sec; and the values stored in $14a=2$ m/min/sec; in $14b=4$ m/min/sec; and in $14c=10$ m/min/sec. Accordingly, the irregular optical fiber portion detector according to the present invention detected irregularities at each of ten locations on the optical fiber, while the conventional external diameter measuring device only detected three of the ten irregular portions.

Thus, as set forth above, the method and apparatus for detecting irregular portions in an optical fiber according to the present invention operates by measuring and temporarily storing the pulling rate of the pulling capstan, then computing the pulling rate variation ratio for a predetermined time interval.

When the optical fiber preform having residual bubbles is drawn into an optical fiber, the bubbles collapse or contract, causing the diameter of the drawn optical fiber to decrease even though the pulling rate is controlled in order to maintain a consistent external diameter. The present invention permits the detection of such an irregularity which the conventional external diameter measuring device is unable to detect.

What is claimed is:

1. A method of compensating for and detecting irregularities in an optical fiber during a drawing process for forming the optical fiber, comprising the steps of:
   (a) repeatedly measuring an external diameter of the optical fiber as the optical fiber is drawn by an optical fiber drawing device;
   (b) varying an optical fiber drawing rate in accordance with the external diameter of the optical fiber, thereby compensating for variations in the external diameter of the optical fiber;
   (c) computing a ratio of a drawing rate variation to a fixed time interval;
   (d) comparing the computed ratio value to a previously selected and stored value; and
   (e) indicating an irregularity in the optical fiber if the computed ratio value differs from the stored value by a threshold amount.

2. The method as claimed in claim 1, wherein said computing step comprises the steps of:
   (a) retrieving a reference time datum;
   (b) storing a variable time datum and a corresponding optical fiber drawing rate;
   (c) computing a ratio of an optical fiber drawing rate variation to a time interval between the reference time datum and the stored variable time datum; and
   (d) incrementing the reference time datum.

3. An apparatus for detecting and compensating for irregular portions in an optical fiber during a drawing process for forming the optical fiber, comprising:
   (a) a measuring unit for measuring an external diameter of the optical fiber as the optical fiber is drawn at a drawing rate;
   (b) a feedback unit for varying said drawing rate of the optical fiber according to said measured external diameter of the optical fiber; and
   (c) a processing unit for detecting an irregularity in the optical fiber by computing a ratio of a variation in the drawing rate relative to a predetermined time period.

4. The apparatus as claimed in claim 3, wherein said processing unit comprises:
   (a) an input unit for sampling a drawing rate of the optical fiber;
   (b) a storage unit for storing said sampled drawing rate and a corresponding time datum;
   (c) an operator for computing a ratio of a variation in the drawing rate to a time period between a reference time and said time datum during which said variation in the drawing rate occurred;
   (d) a storage unit for storing a reference ratio value;
   (e) a comparator for comparing said ratio computed by said operator with said stored reference ratio value; and
   (f) an indicating device for indicating an irregularity in the optical fiber when said comparator determines that said ratio computed by said operator differs from said stored reference ratio value by a threshold amount.

* * * * *